(12) United States Patent
Kobayashi

(10) Patent No.: US 12,413,114 B2
(45) Date of Patent: Sep. 9, 2025

(54) VIBRATION MOTOR WITH HOUSING HAVING FIRST AND SECOND NOTCHES FOR LEAD WIRE AND FLEXIBLE PRINTED CIRCUIT BOARD

(71) Applicant: Nidec Corporation, Kyoto (JP)

(72) Inventor: Tomohiro Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 244 days.

(21) Appl. No.: 18/127,799

(22) Filed: Mar. 29, 2023

(65) Prior Publication Data

US 2023/0318396 A1 Oct. 5, 2023

(30) Foreign Application Priority Data

Mar. 31, 2022 (JP) ................. 2022-058224

(51) Int. Cl.
*H02K 33/02* (2006.01)
*H02K 5/22* (2006.01)

(52) U.S. Cl.
CPC ............. *H02K 5/225* (2013.01); *H02K 33/02* (2013.01); *H02K 2203/03* (2013.01)

(58) Field of Classification Search
CPC .. H02K 7/1869; H02K 7/1876; H02K 7/1892; H02K 33/12; H02K 33/00; H02K 33/02; H02K 33/04; H02K 33/06; H02K 33/16; H02K 35/00; H02K 35/02; H02K 5/02; H02K 5/04; H02K 5/24; H02K 5/22; H02K 5/225; H02K 2203/03
USPC .......................................... 310/15–25, 89, 71
See application file for complete search history.

(56) References Cited

U.S. PATENT DOCUMENTS

| | | | | |
|---|---|---|---|---|
| 1,918,364 A * | 7/1933 | Winsor | .................. | H02K 33/12 310/35 |
| 4,529,906 A * | 7/1985 | McMahon | ................ | G01S 1/72 310/27 |
| 5,107,155 A * | 4/1992 | Yamaguchi | ............ | H02K 7/063 340/407.1 |
| 5,661,352 A * | 8/1997 | Oguchi | .................. | H02K 5/225 310/71 |
| 5,705,866 A * | 1/1998 | Oguchi | .................. | H02K 1/187 310/90 |
| 5,730,619 A * | 3/1998 | Hamlin | ................. | H01R 13/193 439/573 |
| 6,121,701 A * | 9/2000 | Kloeppel | ............ | G11B 19/2009 310/71 |
| 6,271,610 B1 * | 8/2001 | Ibata | ........................ | H02K 5/00 310/40 MM |
| 6,413,117 B1 * | 7/2002 | Annerino | ........... | H01R 12/7076 439/500 |

(Continued)

*Primary Examiner* — Maged M Almawri
(74) *Attorney, Agent, or Firm* — Keating & Bennett, LLP

(57) ABSTRACT

A vibration motor includes a stationary portion and a movable portion to vibrate in a center axis direction with respect to the stationary portion. The stationary portion includes a coil to apply a driving force to the movable portion by energization, and a housing that accommodates the movable portion and the coil. The housing includes a notch recessed inward from an outer edge of the housing in the center axis direction. The notch includes a first notch recessed inward from an outer edge of the housing in the center axis direction, and a second notch recessed inward from an outer edge of the first notch in the center axis direction. A lead wire of the coil extends out of the housing through the notch.

8 Claims, 7 Drawing Sheets

(56) References Cited

U.S. PATENT DOCUMENTS

| | | | | |
|---|---|---|---|---|
| 6,737,780 B1* | 5/2004 | Fisher | H02K 1/17 | 310/154.14 |
| 7,579,731 B2* | 8/2009 | Fukushima | H02K 5/1672 | 310/40 MM |
| 7,646,122 B2* | 1/2010 | Uchiumi | H02K 5/00 | 310/91 |
| 7,825,555 B2* | 11/2010 | Uchiumi | H02K 5/225 | 310/91 |
| 8,004,131 B2* | 8/2011 | Yu | H02K 1/145 | 310/71 |
| 9,742,240 B2* | 8/2017 | Katada | H02K 5/225 | |
| 10,111,324 B2* | 10/2018 | Koepsell | H05K 1/028 | |
| 10,890,169 B2* | 1/2021 | Jeong | F04B 53/16 | |
| 11,418,099 B2* | 8/2022 | Takahashi | H02K 33/16 | |
| 2001/0013730 A1* | 8/2001 | Yamaguchi | H02K 23/54 | 310/DIG. 6 |
| 2002/0140304 A1* | 10/2002 | Dreher | H02K 17/30 | 310/89 |
| 2003/0127921 A1* | 7/2003 | Akutsu | H02K 3/50 | 310/68 R |
| 2004/0256920 A1* | 12/2004 | Gummin | F03G 7/0635 | 310/15 |
| 2005/0046302 A1* | 3/2005 | Suzuki | H02K 7/061 | 310/239 |
| 2005/0073205 A1* | 4/2005 | Takagi | H02K 5/00 | 310/89 |
| 2006/0138885 A1* | 6/2006 | Uchiumi | H02K 5/00 | 310/71 |
| 2006/0170296 A1* | 8/2006 | Nakajima | H02K 7/1166 | 310/239 |
| 2008/0291650 A1* | 11/2008 | Hautvast | H05K 1/147 | 361/772 |
| 2009/0039721 A1* | 2/2009 | Takagi | H05K 3/341 | 310/81 |
| 2010/0102645 A1* | 4/2010 | Trietz | H02N 2/04 | 310/12.31 |
| 2011/0291510 A1* | 12/2011 | Hara | H02K 7/061 | 310/91 |
| 2013/0169071 A1* | 7/2013 | Endo | H02K 33/12 | 310/25 |
| 2014/0035397 A1* | 2/2014 | Endo | H02K 33/18 | 310/30 |
| 2014/0062225 A1* | 3/2014 | Kim | H02K 33/00 | 310/15 |
| 2014/0084710 A1* | 3/2014 | Endo | H02K 33/16 | 310/25 |
| 2014/0175955 A1* | 6/2014 | Katada | H02K 5/225 | 310/68 R |
| 2014/0306556 A1* | 10/2014 | Kim | H02K 33/16 | 310/25 |
| 2015/0123498 A1* | 5/2015 | Yang | H02K 33/16 | 310/25 |
| 2015/0372569 A1* | 12/2015 | Lau | H02K 5/148 | 310/71 |
| 2018/0219465 A1* | 8/2018 | Katada | B06B 1/045 | |
| 2019/0070635 A1* | 3/2019 | Takeda | H02K 33/18 | |
| 2019/0115816 A1* | 4/2019 | Takahashi | A45D 29/14 | |
| 2019/0305659 A1* | 10/2019 | Kitahara | H02K 33/18 | |
| 2019/0379263 A1* | 12/2019 | Zhu | H02K 33/06 | |
| 2020/0076287 A1* | 3/2020 | Takahashi | H02K 33/06 | |
| 2020/0161955 A1* | 5/2020 | Kitahara | H02K 33/16 | |
| 2021/0336521 A1* | 10/2021 | Ando | H02K 33/18 | |
| 2023/0198366 A1* | 6/2023 | Tsuchihashi | H02K 33/18 | 310/28 |

* cited by examiner

VIBRATION MOTOR WITH HOUSING HAVING FIRST AND SECOND NOTCHES FOR LEAD WIRE AND FLEXIBLE PRINTED CIRCUIT BOARD

CROSS-REFERENCE TO RELATED APPLICATIONS

The present application claims priority under 35 U.S.C. § 119 to Japanese Patent Application No. 2022-058224, filed on Mar. 31, 2022, the entire contents of which are hereby incorporated herein by reference.

1. FIELD OF THE INVENTION

The present disclosure relates to a vibration motor.

2. BACKGROUND

Conventionally, various apparatuses such as a smartphone and other portable devices include a vibration motor as a vibration generation device. The vibration motor is used for a function of notifying the user of an incoming call, an alarm, and the like, or a function of haptic feedback in a human interface, for example.

In general, a vibration motor includes a stator, an elastic member, and a vibrator. The stator includes a chassis and a coil. The vibrator includes a magnet. The vibrator and the chassis are connected by an elastic member. When the coil is energized to generate a magnetic field, the vibrator vibrates. However, in the conventional vibration motor, a circuit board and a coil are connected inside a chassis, and there is a problem in connection workability.

SUMMARY

An example embodiment of a vibration motor of the present disclosure includes a stationary portion and a movable portion to vibrate in a center axis direction with respect to the stationary portion. The stationary portion includes a coil to apply a driving force to the movable portion by energization, and a housing that accommodates the movable portion and the coil. The housing includes a notch recessed inward from an outer edge of the housing in the center axis direction. The notch includes a first notch recessed inward from an outer edge of the housing in the center axis direction, and a second notch recessed inward from an outer edge of the first notch in the center axis direction. A lead wire of the coil extends out of the housing through the notch.

The above and other elements, features, steps, characteristics and advantages of the present disclosure will become more apparent from the following detailed description of the example embodiments with reference to the attached drawings.

DETAILED DESCRIPTION

Figure 1:
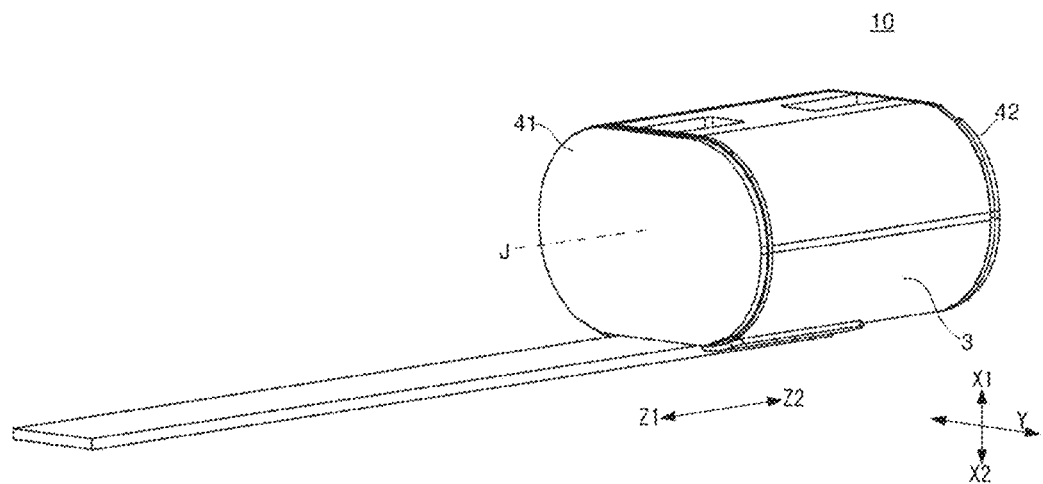
FIG. 1 is a perspective view illustrating an external appearance of a vibration motor according to an example embodiment of the present disclosure.

Hereinafter, example embodiments of the present disclosure will be described with reference to the drawings.

In the drawings, a center axis direction in which the center axis J of a vibration motor 10 extends is defined as a Z direction, one side in the center axis direction is defined as Z1, and the other side in the center axis direction is defined as Z2. Additionally, a first direction perpendicular to the center axis direction is defined as an X direction, and one side in the first direction is defined as X1, while the other side in the first direction is defined as X2. Additionally, a second direction perpendicular to the center axis direction and the first direction is referred to as a Y direction.

FIG. 1 is a perspective view illustrating an external appearance of the vibration motor 10 according to the present example embodiment of the present disclosure.

Figure 2:
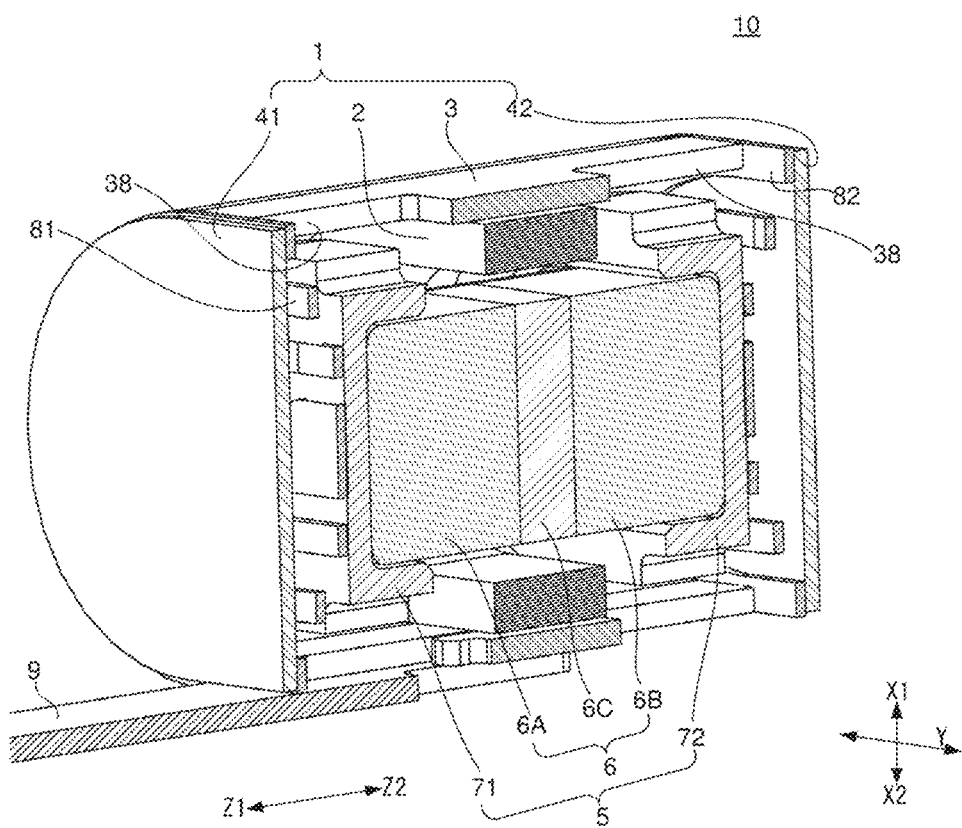
FIG. 2 is a cross-sectional perspective view of the vibration motor.

FIG. 2 is a cross-sectional perspective view of the vibration motor 10.

The vibration motor 10 includes a stationary portion 1, a movable portion 5, and elastic members 81 and 82. The movable portion 5 is capable of vibrating or in the center axis direction (Z direction) with respect to the stationary portion 1.

The stationary portion 1 includes a coil 2, a housing 3, and lids 41 and 42. The housing 3 is a plate-like member formed to extend in the circumferential direction around the center axis J as the circumferential direction. The housing 3 has a tubular shape extending in the center axis direction. The housing 3 is made of a magnetic body.

The magnetic body is stainless steel, for example.

The coil 2 is formed by winding a conductive wire around the center axis J, and is fixed to the inner surface of the housing 3. That is, the housing 3 accommodates the coil 2 therein. The coil 2 generates a magnetic field by being energized. The coil 2 is disposed at a center portion in the center axis direction of the housing 3.

The movable portion 5 includes a core portion 6 and holders 71 and 72, and is accommodated inside the housing 3. That is, the stationary portion 1 includes the housing 3 that accommodates the movable portion 5 and the coil 2.

The core portion 6 includes a magnet 6A on one side in the center axis direction and a magnet 6B on the other side in the center axis direction. The core portion 6 further includes a magnetic body portion 6C. The magnetic body portion 6C is disposed to be held between the magnets 6A and 6B in the center axis direction.

For example, the other side in the center axis direction of the magnet 6A is the N pole, and one side in the center axis direction is the S pole. One side in the center axis direction of the magnet 6B is the N pole, and the other side in the center axis direction is the S pole. Thus, the N poles oppose each other in the center axis direction across the magnetic body portion 6C. That is, the magnetic poles of the magnets 6A and 6B on the side facing the magnetic body portion 6C are the same. As a result, the magnetic flux flows from the S pole to the N pole in the magnets 6A and 6B, flows radially outward in the magnetic body portion 6C, and penetrates the coil 2 in the radial direction. Note that the radial direction is a radial direction with respect to the center axis J. With the housing 3 made of a magnetic body, the magnetic flux having penetrated the coil 2 flows in the housing 3 in the center axis direction and is returned to the S poles of the magnets 6A and 6B. With such a configuration, the amount of magnetic flux penetrating the coil 2 can be increased.

The N pole and the S pole of the magnet may be reversed. In this case, the magnetic flux flows in a direction opposite to the above.

The holder 71 holds one end portion in the center axis direction of the magnet 6A. The holder 72 holds the other end portion in the center axis direction of the magnet 6B. The holders 71 and 72 function as weights, and are made of a tungsten alloy, for example.

The elastic members 81 and 82 are compression springs that can expand and contract in the center axis direction. The other end portion in the center axis direction of the elastic member 81 is fixed to the end face on one side in the center axis direction of the holder 71. The one end portion in the center axis direction of the elastic member 81 is fixed to the end face on one side in the center axis direction of the housing 3.

The one end portion in the center axis direction of the elastic member 82 is fixed to the end face on one side in the center axis direction of the holder 72. The other end portion in the center axis direction of the elastic member 82 is fixed to the end face on the other side in the center axis direction of the housing 3.

The lids 41 and 42 are plate-like members whose thickness direction is the center axis direction. The lid 41 is disposed on one side in the center axis direction of the elastic member 81, and is fixed to one end portion in the center axis direction of the elastic member 81. The lid 42 is disposed on the other side in the center axis direction of the elastic member 82, and is fixed to the other end portion in the center axis direction of the elastic member 82.

In a non-operational state in which the coil 2 is not energized, the movable portion 5 is in a stopped state by application of the elastic force toward the other side in the center axis direction by the elastic member 81 compressed from the natural length state and the elastic force toward the one side in the center axis direction by the elastic member 82 compressed from the natural length state. In the non-operational state, the magnetic body portion 6C of the movable portion 5 is located at the center position of the coil 2 in the center axis direction (FIG. 2). The core portion 6 is disposed radially inside the coil 2.

When the coil 2 is energized, driving force is applied to the core portion 6 by an interaction between the magnetic field generated by the coil 2 and the magnetic field generated by the core portion 6. That is, the stationary portion 1 includes the coil 2 that applies a driving force to the movable portion 5 by energization. When the driving force is applied to the movable portion 5, the movable portion 5 vibrates in the center axis direction.

Thus, since the vibration motor 10 can be configured not to use a shaft that guides the movable portion unlike the conventional case, it is possible to suppress reduction in the weight of the movable portion 5 and the volume of the core portion 6. Accordingly, the amount of vibration of the vibration motor 10 can be secured. Sliding between the movable portion and the shaft is eliminated, and noise and wear due to sliding are avoided.

Figure 3:
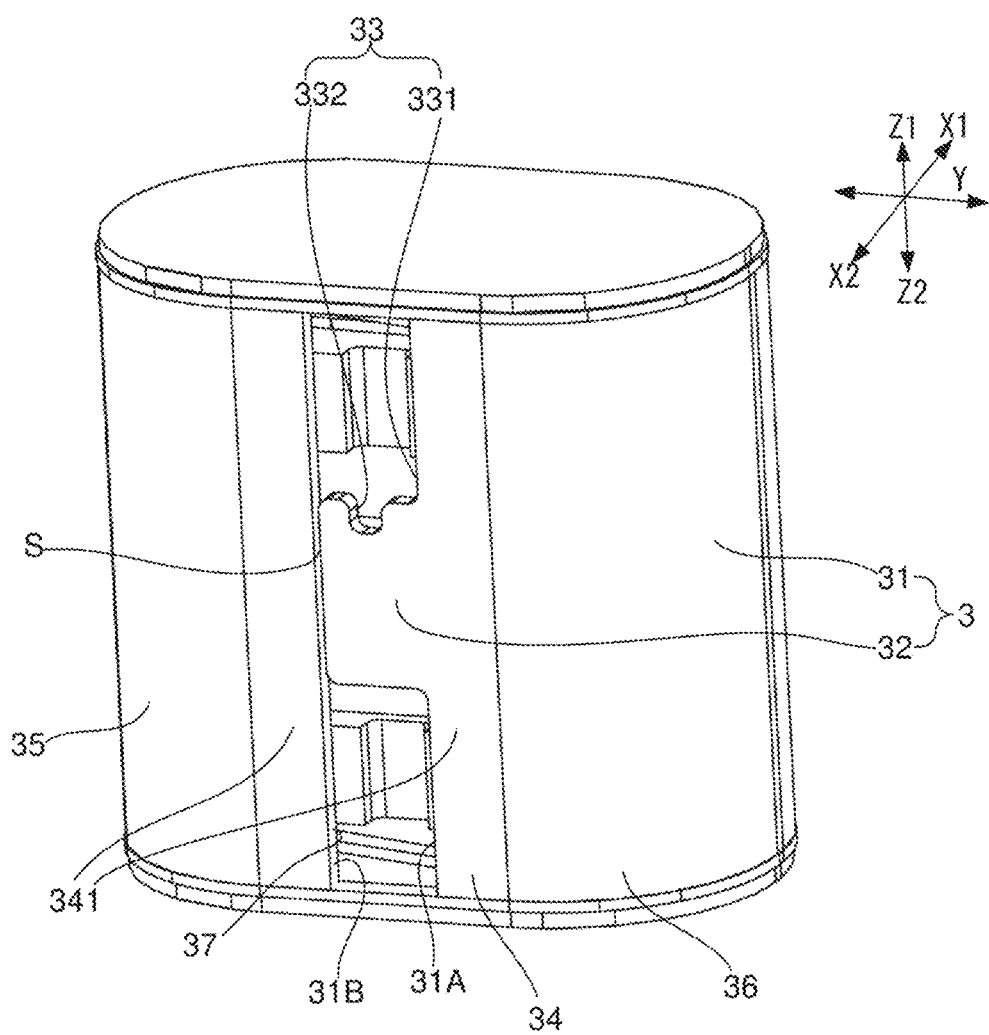
FIG. 3 is a perspective view of a partial configuration of the vibration motor as viewed from a first region side.

FIG. 3 is a perspective view of a partial configuration of the vibration motor 10 as viewed from a first region 34 side. As illustrated in FIG. 3, the housing 3 includes a continuous portion 31 formed continuously in the circumferential direction, and a protrusion 32 protruding to one side in the circumferential direction from a one circumferential end portion 31A of the continuous portion 31. The protrusion 32 has a gap S with another circumferential end portion 31B of the continuous portion 31.

The protrusion 32 is located at the center of the housing 3 in the center axis direction. A first notch 331 is formed by being surrounded by the other circumferential end portion 31B, the one circumferential end portion 31A, and the protrusion 32. A second notch 332 is formed by being recessed from one end in the center axis direction to the other side in the center axis direction of the protrusion 32. That is, the first notch 331 is formed by the other circumferential end portion 31B, the one circumferential end portion 31A, and the protrusion 32, and the second notch 332 is provided in the protrusion 32.

Thus, the housing 3 can be manufactured by bending one plate material, and the first notch 331 and the second notch 332 can be easily formed.

The first notch 331 and the second notch 332 constitute a notch 33. The notch 33 is recessed from the one side end in the center axis direction of the housing 3 to the other side in the center axis direction. That is, the housing 3 has the notch 33 recessed inward from the outer edge of the housing 3 in the center axis direction. The notch 33 includes a first notch 331 recessed inward from the outer edge of the housing 3 in the center axis direction and a second notch 332 recessed inward from the outer edge of the first notch 331 in the center axis direction. In other words, the housing 3 includes the notch 33 recessed from the outer edge of the housing 3 toward the other side in the center axis direction with the outside of the housing 3 as one side in the center axis direction.

Figure 4:
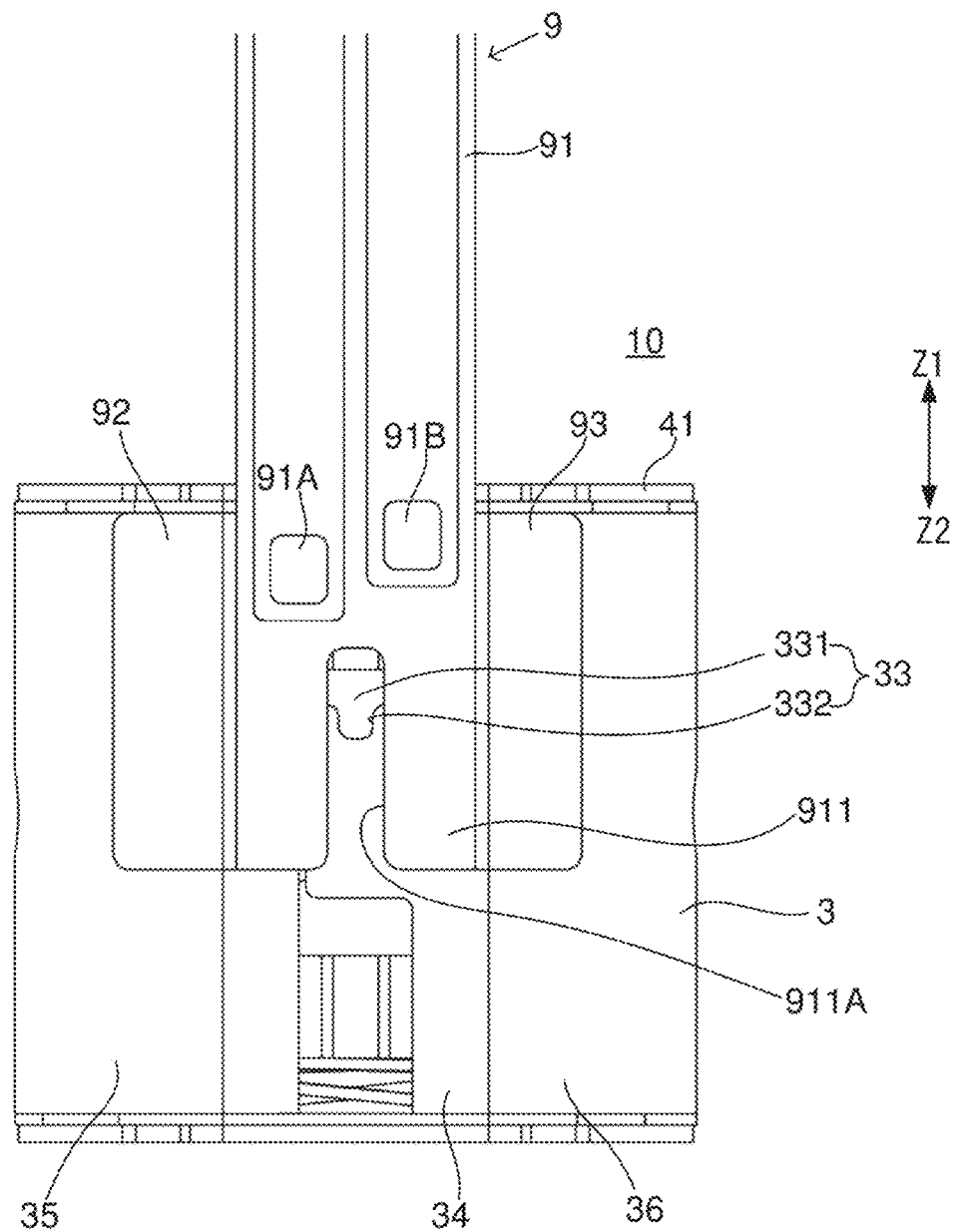
FIG. 4 is a plan view illustrating a partial configuration of the vibration motor.

A lead wire (not illustrated) of the coil 2 is drawn out of the housing 3 through the notch 33. Here, FIG. 4 is a plan view illustrating a partial configuration of the vibration motor 10. FIG. 4 is a view of the housing 3 as viewed in a direction perpendicular to the first region 34. The first region 34 is a flat bottom portion disposed on the other side in the first direction in the housing 3. That is, the first region 34 is a flat portion.

As illustrated in FIG. 4, a flexible printed circuit (FPC) 9 is fixed to the housing 3. That is, the stationary portion 1 includes the FPC 9 fixed to the housing 3. The FPC 9 has a base portion 91 extending in the center axis direction. The other end portion 911 in the center axis direction of the base portion 91 is fixed to the first region 34. The base portion 91 protrudes and extends from the lid 41 to the other side in the center axis direction. That is, the FPC 9 has the base portion 91 extending in the center axis direction and fixed to the first region 34.

The base portion 91 has electrode portions 91A and 91B. The lead wire drawn out from the notch 33 is connected to the electrode portions 91A and 91B. Thus, in the vibration motor 10 of the present example embodiment, since the lead wire of the coil 2 is connected to the FPC 9 outside the housing 3, the workability of connection is improved.

As illustrated in FIG. 3, the first region 34 includes the protrusion 32 and both side portions 341 in the circumferential direction of the protrusion 32. The both side portions 341 in the circumferential direction extend in the center axis direction. Therefore, the first region 34 is provided with the first notch 331 and the second notch 332. That is, the housing 3 has the first region 34 in which the first notch 331 and the second notch 332 are formed.

As illustrated in FIG. 4, the other end portion 911 in the center axis direction in the FPC 9 is fixed so as to cover a part of the first notch 331. The other end portion 911 in the center axis direction may be fixed so as to cover the entire first notch 331. That is, the FPC 9 is fixed to the outer peripheral surface of the first region 34 so as to cover at least a part of the first notch 331. As a result, it is possible to suppress the lead wire from swinging in the notch 33.

As illustrated in FIG. 4, the other end portion 911 in the center axis direction in the FPC 9 has an FPC notch 911A recessed on one side in the center axis direction. That is, the FPC 9 has the FPC notch 911A recessed from the outer edge on the other side in the center axis direction toward the one side in the center axis direction in the direction at the time of fixing to the first region 34. The lead wire of the coil 2 is drawn out through the notch 33 and the FPC notch 911A. That is, the lead wire of the coil 2 is drawn out to the outside of the housing 3 through the notch 33 and the FPC notch 911A.

When fixing the FPC 9 to the housing 3, it is possible to move the FPC 9 from one side in the center axis direction to the other side and put the lead wire into the FPC notch 911A, so that the FPC 9 can be easily fixed. Since both side portions holding the FPC notch 911A are fixed to the housing 3, the fixing area is increased and the fixing can be reinforced.

As illustrated in FIG. 4, the FPC 9 is provided with a protruding piece 92 protruding from the other end portion 911 in the center axis direction to one side in the circumferential direction and a protruding piece 93 protruding from the other end portion 911 in the center axis direction to the other side in the circumferential direction. The housing 3 includes a bent portion 35 connected to one side in the circumferential direction of the first region 34 and a bent portion 36 connected to the other side in the circumferential direction of the first region 34. The bent portion 35 and the bent portion 36 are bent so as to protrude in the second direction away from each other. The protruding piece 92 is fixed to the outer peripheral surface of the bent portion 35. The protruding piece 93 is fixed to the outer peripheral surface of the bent portion 36. That is, the FPC 9 has the protruding pieces 92 and 93 that protrude from the base portion 91 to both sides in the circumferential direction and are fixed to the bent portions 35 and 36.

That is, the housing 3 has the bent portions 35 and 36 connected to both end portions in the circumferential direction of the first region 34, and the FPC 9 is fixed to the first region 34 and the bent portions 35 and 36. As a result, the contact area of the FPC 9 with respect to the housing 3 increases, and the fixing strength can be improved.

As illustrated in FIG. 4, when viewed in a direction perpendicular to the first region 34, the protruding pieces 92 and 93 overlap the electrode portions 91A and 91B in the center axis direction. As a result, when tension is applied to the base portion 91, it is possible to suppress peeling of the portions of the base portion 91 where the electrode portions 91A and 91B are provided from the housing 3, and to suppress connection failure or the like between the lead wire and the electrode portions 91A and 91B. For the same effect, the protruding pieces 92 and 93 may be disposed on one side in the center axis direction (above the paper surface of FIG. 4) with respect to the electrode portions 91A and 91B when viewed in a direction perpendicular to the first region 34.

When the housing has a plurality of notches, the second notch may be provided in at least one notch. For example, in the present example embodiment, the housing 3 has a notch in addition to the notch 33 including the first notch 331 and the second notch 332. The other notch has the same shape as the notch 33 except for the second notch 332, and one notch 37 (FIG. 3) is provided on the other side in the center axis direction and two notches 38 (FIG. 2) are provided at a location of the housing 3 located on the opposite side to the first region 34 across the central axis.

Figure 5:
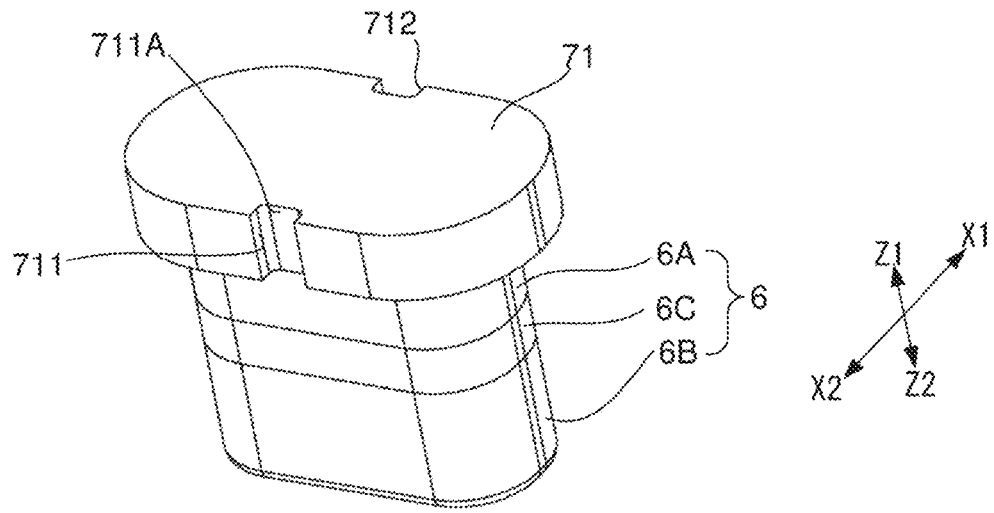
FIG. 5 is a perspective view illustrating a configuration of a core portion and a holder according to an example embodiment of the present disclosure in a movable portion.
Figure 6:
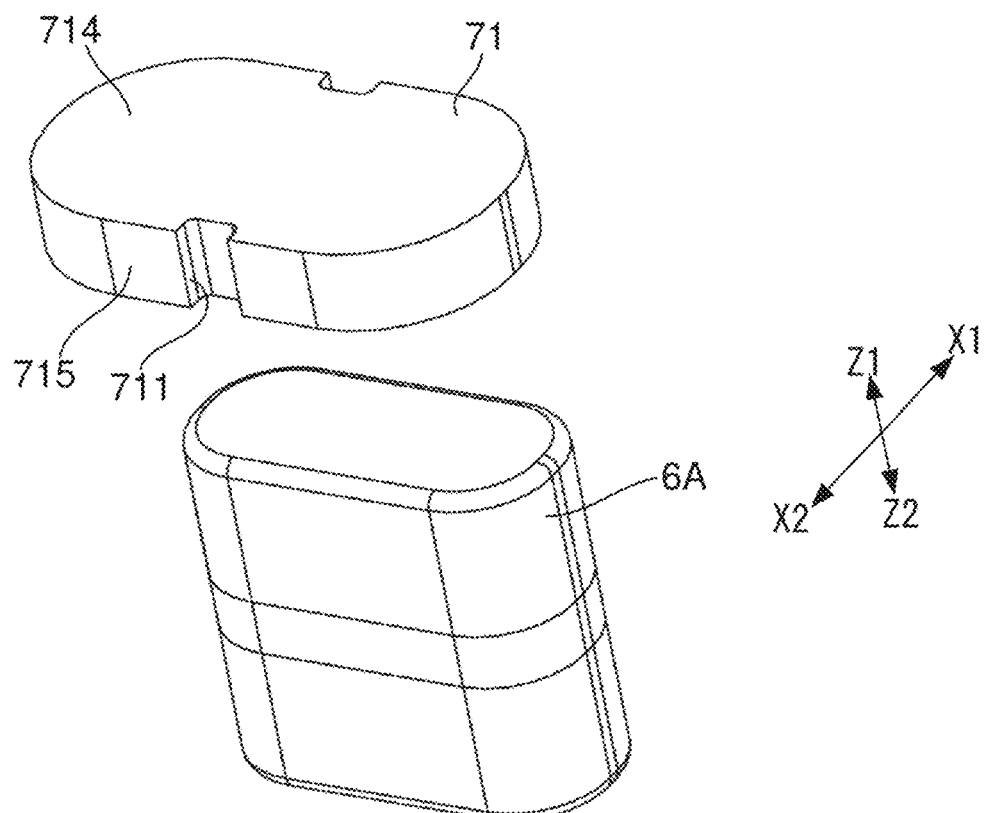
FIG. 6 is an exploded perspective view in which a core portion and a holder according to an example embodiment of the present disclosure are disassembled.
Figure 7:
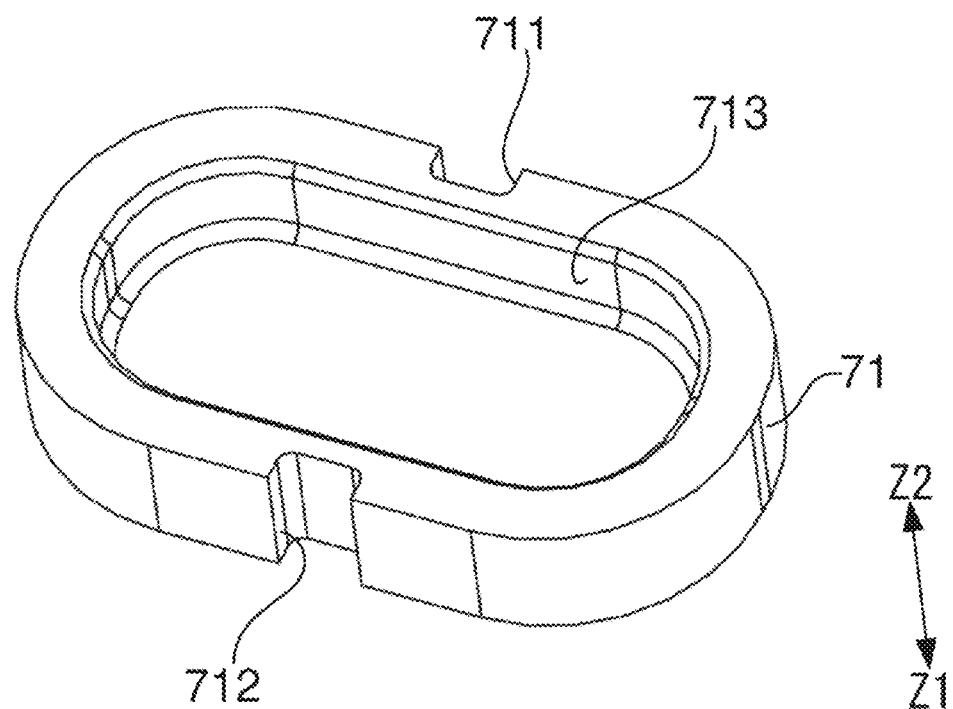
FIG. 7 is a perspective view of a holder according to an example embodiment of the present disclosure.

FIG. 5 is a perspective view illustrating a configuration of the core portion 6 and the holder 71 in the movable portion 5. FIG. 5 illustrates a state in which the holder 71 is attached to the core portion 6. FIG. 6 is an exploded perspective view of the core portion 6 and the holder 71. FIG. 7 is a perspective view of the holder 71.

The holder 71 has a recess 713 (FIG. 7) recessed toward one side in the center axis direction. The holder 71 is fixed to the magnet 6A by inserting the magnet 6A into the recess 713. That is, the movable portion 5 includes the magnet 6A and the holder 71 fixed to one side in the center axis direction of the magnet 6A and having a larger radial width than the magnet 6A.

The holder 71 has a holder notch 711 that is recessed from the outer edge of the holder 71 toward one side in the first direction. A bottom portion 711A of the holder notch 711 is disposed on the other side in the first direction with respect to the outer edge of the magnet 6A.

Figure 8:
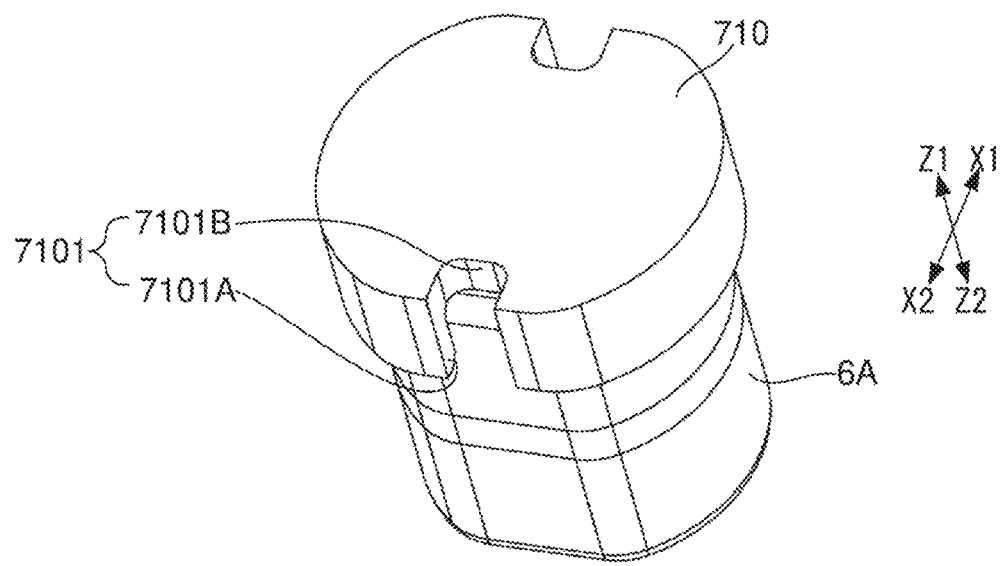
FIG. 8 is a perspective view illustrating a configuration of a holder according to a comparative example embodiment of the present disclosure.

Here, FIG. 8 is a perspective view illustrating a configuration of a holder 710 according to a comparative example. The holder 710 has a holder notch 7101. The holder notch 7101 has openings 7101A and 7101B. The opening 7101A opens in the first direction. The opening 7101B is connected to one side in the center axis direction of the opening 7101A, and opens in the center axis direction. When the opening 7101A is viewed in the first direction, a part of the other end surface in the first direction of the magnet 6A is exposed. When the opening 7101B is viewed in the center axis direction, a part of the end surface on one side in the center axis direction of the magnet 6A is exposed.

On the other hand, in the configuration according to the present example embodiment (FIG. 5), the magnet 6A is not exposed even when the holder notch 711 is viewed in the first direction and the center axis direction. Therefore, the contact area of the holder 71 with respect to the magnet 6A is increased, and the fixing strength of the holder 71 is improved. In the case of fixing with the liquid adhesive, the possibility that the adhesive leaks from the holder notch 711 at the time of fixing is reduced.

In addition, as illustrated in FIG. 6, the holder 71 includes a holder flat portion 714 that extends perpendicularly to the center axis J, and a holder wall portion 715 that extends from the outer end portion in the first direction of the holder flat portion 714 to the other side in the center axis direction. The holder flat portion 714 covers at least a part of the outer end portion in the first direction of the magnet 6A. The contact area between the holder 71 and the magnet 6A is increased by the holder flat portion 714 and the holder wall portion 715, and the fixing strength of the holder 71 can be improved.

The holder 71 includes a holder notch 712 at a position facing the holder notch 711 in the first direction.

Figure 9:
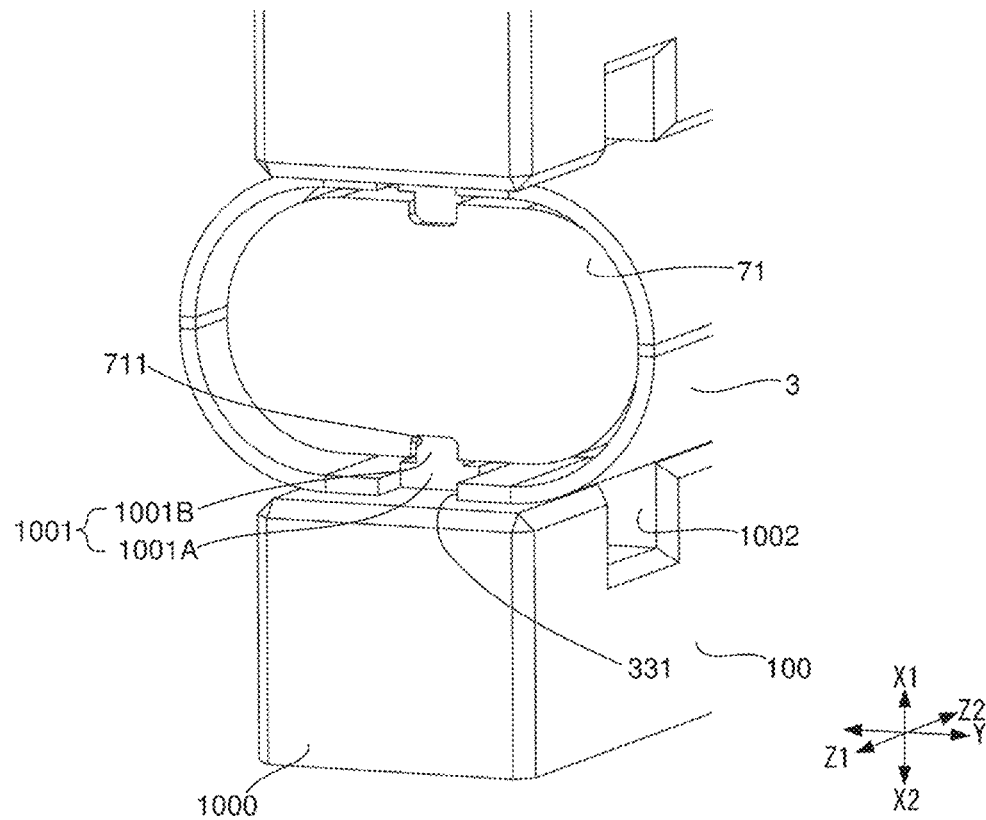
FIG. 9 is a perspective view illustrating the middle of the manufacturing process of the vibration motor according to an example embodiment of the present disclosure.

Here, a jig used when the vibration motor 10 is manufactured will be described. FIG. 9 is a perspective view illustrating the middle of the manufacturing process of the vibration motor 10. In FIG. 9, the housing 3 is installed on a jig 100.

The jig 100 includes a base portion 1000, a positioning portion 1001, and a hole 1002. The positioning portion 1001 is disposed on one side in the first direction of the base portion 1000. The positioning portion 1001 includes a first extending portion 1001A extending in the center axis direction and a second extending portion 1001B extending in the center axis direction. The second extending portion 1001B is disposed on one side in the first direction of the first extending portion 1001A. The width in the second direction of the second extending portion 1001B is narrower than the width in the second direction of the first extending portion 1001A. That is, the positioning portion 1001 is formed in a rail shape extending in the center axis direction.

The hole 1002 is formed to be recessed from the surface on one side in the first direction of the base portion 1000 to the other side in the first direction and penetrates in the second direction.

Figure 10:
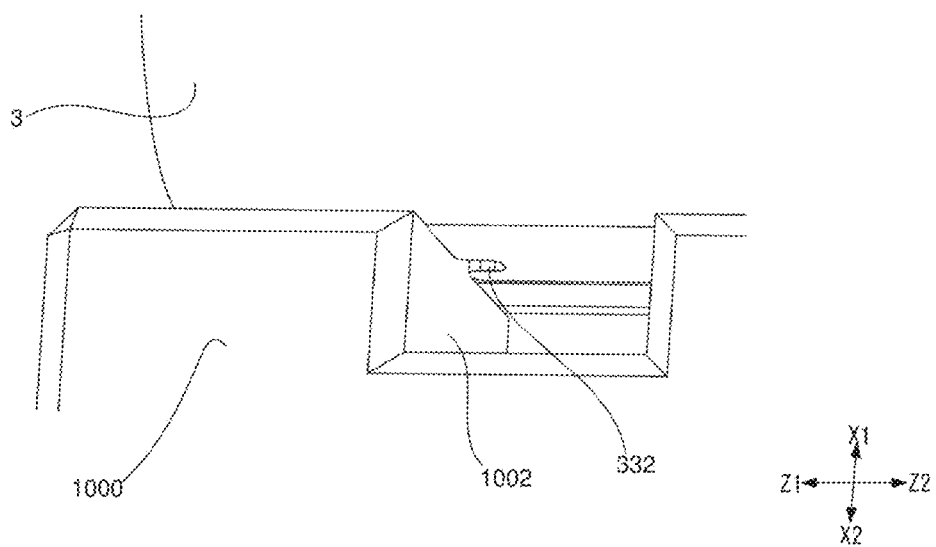
FIG. 10 is a perspective view of a housing according to an example embodiment of the present disclosure as viewed through a hole of a jig.

The first extending portion 1001A is inserted into the first notch 331 of the housing 3, and the housing 3 is installed on the base portion 1000. As illustrated in FIG. 10, in such an installation state, the hole 1002 and the second notch 332 face each other in the first direction.

The housing 3 is installed in the jig 100 in a state where the lead wire is drawn out from the second notch 332 to the outside of the housing 3 in advance. Since the first notch 331 is used for fixing the jig 100 and the second notch 332 is used for drawing the lead wire, interference between the jig and the lead wire is suppressed. Accordingly, an adverse effect on the lead wire can be suppressed.

In addition, the holder 71 fixed to the magnet 6A is installed in the positioning portion 1001. More specifically, the holder 71 is slid from one side in the center axis direction to the other side in the center axis direction so that the second extending portion 1001B passes through the holder notch 711 of the holder 71. Thus, in the manufactured vibration motor 10, the first notch 331 overlaps the holder notch 711 when viewed from the first direction. That is, the holder 71 has the holder notch 711 overlapping the notch 33 when viewed from the first direction. Accordingly, the relative positioning between the housing 3 and the holder 71 can be performed by fixing the notch 33 of the housing 3 and the holder notch 711 to the positioning portion 1001.

The holder notch 711 penetrates from one side in the center axis direction to the other side in the center axis direction (see FIG. 5). Thus, the magnet 6A can be inserted into the housing 3 by sliding the holder 71 in the center axis direction while positioning on the positioning portion 1001.

The holder notch 711 is provided in the holder flat portion 714 and the holder wall portion 715 (see FIG. 6). Thus, the holder notch 711 can be formed long in the center axis direction, and the holder 71 can be stably installed on the jig 100.

The vibration motor 10 according to the above-described example embodiment can be mounted on various electronic devices.

By the above, an electronic device can be vibrated to realize functions such as notification to the operator or tactile feedback.

Figure 11:
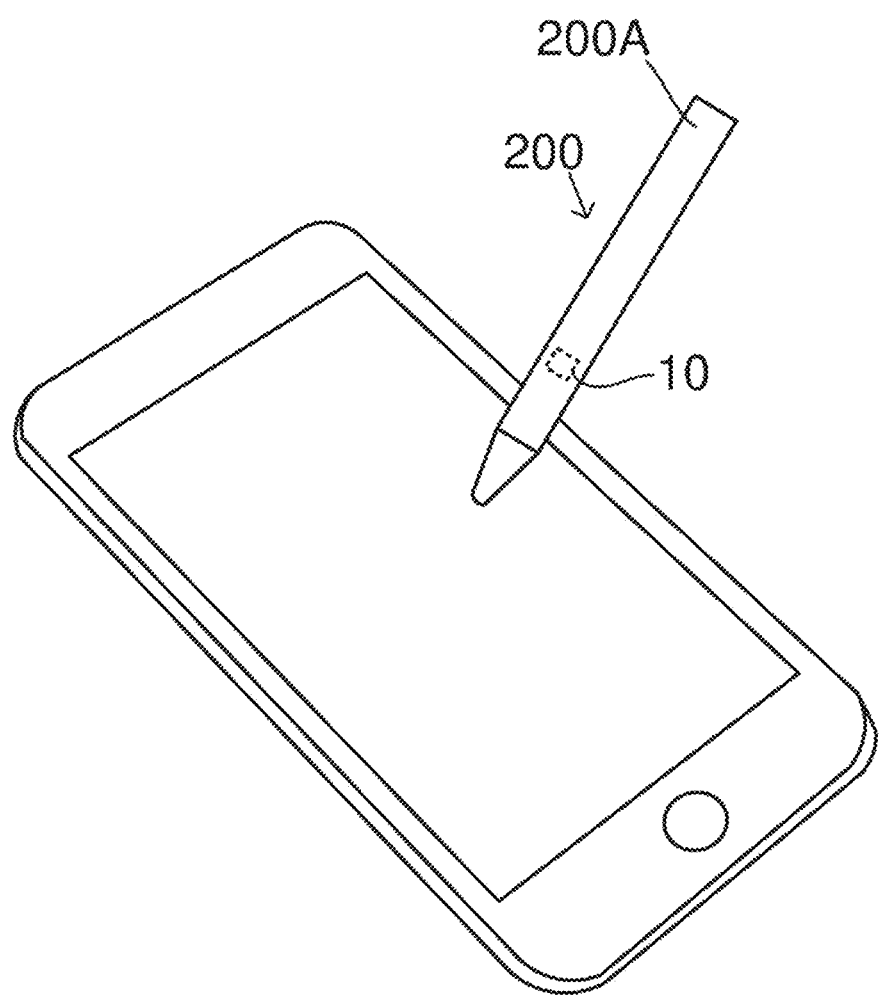
FIG. 11 is a diagram illustrating an example of a haptic device according to an example embodiment of the present disclosure.

The vibration motor 10 can be mounted on, for example, a haptic device 200 schematically illustrated in FIG. 11. The haptic device 200 includes a chassis 200A and a vibration motor 10 accommodated in the chassis 200A. The haptic device 200 is a device that gives a tactile stimulus to a person who operates the haptic device 200 by vibration of the vibration motor 10.

The haptic device 200 illustrated in FIG. 11 is, for example, a stylus pen. Since the vibration motor 10 outputs vibration according to setting, it is possible to give haptic feedback to the operator as if the operator is operating the haptic device 200 on paper, a blackboard, or the like even though the operator is operating the haptic device 200 in contact with a tablet device or the like.

Note that the haptic device is not limited to a stylus pen, and a smartphone, a tablet, a game device, a wearable terminal, and the like can also be employed.

The example embodiments of the present disclosure have been described above. The scope of the present disclosure is not limited to the above example embodiment. The present disclosure can be implemented by making various changes to the above example embodiment without departing from the gist of the disclosure. The matters described in the above example embodiment can be optionally combined together, as appropriate, as long as there is no inconsistency.

As described above, the vibration motor 10 according to another aspect of the present disclosure includes the stationary portion 1 and the movable portion 5 capable of vibrating in the center axis direction with respect to the stationary portion 1. The stationary portion includes the coil 2 to apply a driving force to the movable portion by energization, and the housing 3 that accommodates the movable portion and the coil. The housing has the notch 33 recessed from an outer edge of the housing toward the other side in the center axis direction with the outside of the housing as one side in the center axis direction. The movable portion includes the magnet 6A and the holder 71 fixed to one side in the center axis direction of the magnet and having a larger radial width than the magnet. Assuming that a direction orthogonal to the center axis direction is a first direction, the holder has the holder notch 711 that is recessed from an outer edge of the holder to one side in the first direction and overlaps the notch as viewed from the first direction. The bottom portion 711A of the holder notch is disposed on the other side in the first direction with respect to the outer edge of the magnet (first configuration).

In the first configuration, the holder notch 711 penetrates from one side in the center axis direction to the other side in the center axis direction (second configuration).

In the first or second configuration, the holder 71 includes the holder flat portion 714 that extends perpendicularly to the central axis, and the holder wall portion 715 that extends from the outer end portion in the first direction of the holder flat portion to the other side in the center axis direction. The holder flat portion covers at least a part of the outer end portion in the first direction of the magnet 6A. The holder notch 711 is provided in the holder flat portion and the holder wall portion (third configuration).

The techniques, example embodiments, and modifications thereof, of the present disclosure, can be used for a vibration motor mounted on various devices, for example.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibration motor comprising:
a stationary portion; and
a movable portion to vibrate in a center axis direction with respect to the stationary portion; wherein
the stationary portion includes:
a coil to apply a driving force to the movable portion by energization; and
a housing that accommodates the movable portion and the coil;
the housing includes a notch recessed inward from an outer edge of the housing in the center axis direction;
the notch includes:
a first notch recessed inward from an outer edge of the housing in the center axis direction; and
a second notch defined in an outer edge of the first notch and recessed inward from the outer edge of the first notch in the center axis direction; and
a lead wire of the coil extends out to an outside of the housing through the notch.

2. The vibration motor according to claim 1, wherein the housing includes:
a continuous portion continuously extending in a circumferential direction; and
a protruding portion protruding from one circumferential end portion of the continuous portion toward one side in the circumferential direction;
the second notch is provided in the protruding portion; and
the first notch is defined by the other circumferential end portion, the one circumferential end portion, and the protruding portion.

3. A haptic device comprising:
a chassis; and
the vibration motor according to claim 1 accommodated in the chassis.

4. The vibration motor according to claim 1, wherein the first notch and the second notch overlap one another when the vibration motor is viewed along the center axis direction.

5. The vibration motor according to claim 1, wherein the stationary portion includes a Flexible Printed Circuit board (FPC) fixed to the housing;
the housing includes a first region in which the first notch and the second notch are provided; and
the FPC is fixed to an outer peripheral surface of the first region so as to cover at least a portion of the first notch.

6. The vibration motor according to claim 5, wherein an outer side of the housing is defined as one side in the center axis direction;
the FPC includes an FPC notch recessed from an outer edge on another side in the center axis direction toward the one side in the center axis direction in a direction at a time of fixing to the first region; and
the lead wire of the coil extends out of the housing through the notch and the FPC notch.

7. The vibration motor according to claim 5, wherein the first region is a flat portion;
the housing includes a bent portion connected to both end portions of the first region in a circumferential direction; and
the FPC is fixed to the first region and the bent portion.

8. The vibration motor according to claim 7, wherein an outer side of the housing is defined as one side in the center axis direction;
the FPC includes:
a base portion extending in the center axis direction and fixed to the first region; and
a protruding piece that protrudes from the base portion to both sides in a circumferential direction and is fixed to the bent portion;
the base portion includes an electrode portion; and
the protruding piece overlaps the electrode portion in the center axis direction or is provided on the one side in the center axis direction with respect to the electrode portion as viewed in a direction perpendicular or substantially perpendicular to the first region.

* * * * *